E. R. TALLEY.
BIFOCAL LENS.
APPLICATION FILED AUG. 28, 1914.

1,136,060.

Patented Apr. 20, 1915.

Witnesses

Inventor
Edwin R. Talley
by Herbert J. Jacobi
Attorney

UNITED STATES PATENT OFFICE.

EDWIN R. TALLEY, OF ALGONA, IOWA.

BIFOCAL LENS.

1,136,060.   Specification of Letters Patent.   Patented Apr. 20, 1915.

Application filed August 28, 1914. Serial No. 859,043.

*To all whom it may concern:*

Be it known that I, EDWIN R. TALLEY, a citizen of the United States of America, residing at Algona, in the county at Kossuth and State of Iowa, have invented certain new and useful Improvements in Bifocal Lenses, of which the following is a specification.

This invention relates to new and useful improvements in bifocal lenses for eyeglasses and spectacles and particularly to that type or class of lenses of which each lens comprises two parts fitted accurately together and arranged so that the wearer may at will look through either part of the lens, according to whether it is desired to see clearly at close range or at a distance.

The primary object of the invention is the production of a lens of the character stated wherein the component parts are of special construction and particular arrangement with respect one to the other.

A further object resides in providing an auxiliary lens in connection with each main lens, the same to be threaded into the latter and a still further object resides in the provision of a beveled seat in the main lens for the auxiliary lens.

With these and other objects in view my invention consists in the novel features of construction, combination and arrangement of parts, as will be hereinafter referred to and more particularly pointed out in the specification and claims.

Figure 1:
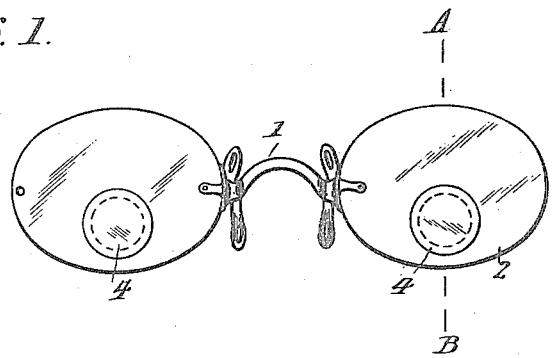
Figure 2:
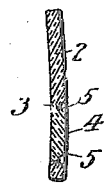

In the accompanying drawing forming a part of this application: Figure 1 is a front elevation of a pair of eye glasses constructed in accordance with my invention, and Fig. 2 is a detail section as seen on line A—B of Fig. 1.

In describing the invention I shall refer to the drawing, in which similar reference characters designate corresponding parts throughout the several views, and in which 1 designates bridge piece or frame to which is secured in the usual or any preferred manner, the lenses 2. Each lens 2 has a substantially circular opening arranged about centrally therein adjacent the lower edge thereof which forms a seat 3 for an auxiliary lens 4, which fits therein. The edge of the opening or seat is beveled and converges toward the rear face of the lens and the edge of the auxiliary lens 4 is also beveled coincident thereto.

In order to removably seat the auxiliary lens in the main lens, the peripheral edge of the former is provided with a spiral groove while the edge of the opening or seat has a single thread 5 formed thereon for engagement with the groove. The auxiliary lens must obviously be applied from the outer face of the lens, in view of the beveled edge and when fitted in position is partially rotated, which threads the same in position. It is thus capable of ready removal for interchangeability, but will not become casually disengaged.

The lenses 2 and 4 may be constructed of different glass and different focal lengths and they may be made variously in size with respect to one another.

By constructing the device as shown and described, to apply the auxiliary lens from the front of the main lens, the eye is not troubled by seeing the edges of the disk or lens 4. Since the edges slope outwardly the effect obtained is that of plain glass, so far as the edges of the glass are concerned. The vision encounters no obstruction in using a bifocal lens constructed in accordance with this invention. The beveled seat further is found in practice to permit the lenses 4 to be more readily and easily removed and replaced than in the ordinary forms.

From the foregoing, it will be seen that I have described a simple, inexpensive and efficient means for carrying out the objects of the invention and while I have particularly described the elements best adapted to perform the functions set forth, it is obvious that various changes in form, proportion and in the minor details of construction, may be resorted to, without departing from the spirit or sacrificing any of the principles of the invention.

Having thus described my invention, what I claim is:

1. In a bifocal lens, a main lens and an auxiliary lens removably applied centrally adjacent the lower edge thereof.

2. In a bifocal lens, a main lens, and an auxiliary lens of circular design removably applied thereto.

3. In a bifocal lens, a main lens, and an auxiliary lens of circular design removably applied thereto, the edge of said latter lens being beveled inwardly.

4. In a bifocal lens, a main lens having a threaded seat therein and an auxiliary lens engaged with said seat.

5. In a bifocal lens, a main lens having a seat therein, the wall of which is beveled inwardly and threaded, and an auxiliary lens having its peripheral edge beveled and threaded for engagement with said seat.

In testimony whereof I affix my signature in presence of two witnesses.

EDWIN R. TALLEY.

Witnesses:
W. H. BAILEY,
W. K. SCHOBY.